United States Patent
Jiang et al.

(10) Patent No.: US 12,522,880 B2
(45) Date of Patent: Jan. 13, 2026

(54) RT-PCR DETECTION METHOD AND KIT FOR NOVEL CORONAVIRUS

(71) Applicant: DAAN GENE CO., LTD., Guangdong (CN)

(72) Inventors: Xiwen Jiang, Guangdong (CN); Zhihui Liao, Guangdong (CN); Jian Fan, Guangdong (CN)

(73) Assignee: DAAN GENE CO., LTD., Guangdong (CN)

( * ) Notice: Subject to any disclaimer, the term of this patent is extended or adjusted under 35 U.S.C. 154(b) by 700 days.

(21) Appl. No.: 17/905,662

(22) PCT Filed: Dec. 30, 2020

(86) PCT No.: PCT/CN2020/141570
§ 371 (c)(1),
(2) Date: Sep. 6, 2022

(87) PCT Pub. No.: WO2021/174984
PCT Pub. Date: Sep. 10, 2021

(65) Prior Publication Data
US 2023/0114907 A1  Apr. 13, 2023

(30) Foreign Application Priority Data
Mar. 3, 2020  (CN) .......... 202010137482.0

(51) Int. Cl.
*C12Q 1/70*  (2006.01)
*C12Q 1/68*  (2018.01)

(52) U.S. Cl.
CPC .......... *C12Q 1/701* (2013.01); *C12Q 2600/16* (2013.01); *C12Q 2600/166* (2013.01)

(58) Field of Classification Search
None
See application file for complete search history.

(56) References Cited

U.S. PATENT DOCUMENTS

2005/0233314 A1  10/2005  Juang et al.

FOREIGN PATENT DOCUMENTS

| CN | 1906306 A | 1/2007 |
|----|-----------|--------|
| CN | 105624335 A | 6/2016 |
| CN | 110982943 A | 4/2020 |
| CN | 111500768 A | 8/2020 |
| CN | 111926121 A | 11/2020 |
| WO | 2011133433 A2 | 10/2011 |
| ZA | 200602353 B | 9/2007 |

OTHER PUBLICATIONS

Corman et al (Eurosurveillance, vol. 25, No. 3; p. 1-8; published online Jan. 23, 2020, in IDS).*
The extended European search report issued in European Application No. 20922897.2, dated Apr. 4, 2024.
Victor M Corman et al., "Detection of 2019 novel coronavirus (2019-nCoV) by real-time RT-PCR", Eurosurveillance, vol. 25, No. 3, Jan. 23, 2020 (8 pages).
Lübke N, Senff T, Scherger S, Hauka S, Andrée M, Adams O, Timm J, Walker A. Extraction-free SARS-CoV-2 detection by rapid RT-qPCR universal for all primary respiratory materials. J Clin Virol. Sep. 2020;130:104579. doi: 10.1016/j.jcv.2020.104579. Epub Aug. 5, 2020.
International Search Report (with English translation) and Written Opinion issued in PCT/CN2020/141570, mailed Mar. 29, 2021, 15 pages provided.
Huang et al., "Clinical features of patients infected with 2019 novel coronavirus in Wuhan, China", The Lancet, vol. 395, No. 1022, published online Jan. 24, 2020, pp. 497-506, Cited in PCT International Search Report.
Kam et al., "A Well Infant With Coronavirus Disease 2019 (COVID-19) With High Viral Load", Clinical Infectious Diseases, published online Feb. 28, 2020, pp. 1-3, Cited in PCT International Search Report.
Guo et al., "Novel Coronavirus 2019-nCoV and Real-time Fluorescent RT-PCR Nucleic Acid Detection", Shaanxi Medical Journal, Mar. 2020, vol. 49, Issue 3, pp. 264-266, with English translation, Cited in PCT International Search Report.

* cited by examiner

*Primary Examiner* — Laura B Goddard
(74) *Attorney, Agent, or Firm* — HSML P.C.

(57) ABSTRACT

A real-time fluorescence RT-PCR detection method and a kit for a novel coronavirus 2019-nCoV. Specifically, the present invention relates to a kit and a method for detecting the nucleic acid of an E gene of the novel coronavirus 2019-nCoV. The kit and the method have extremely high sensitivity and specificity, and can significantly improve the accuracy of virus identification.

14 Claims, 3 Drawing Sheets
Specification includes a Sequence Listing.

SEQUENCE LISTING

<160> NUMBER OF SEQ ID NOS: 10

<210> SEQ ID NO 1
<211> LENGTH: 19
<212> TYPE: DNA
<213> ORGANISM: Artificial sequence
<220> FEATURE:
<223> OTHER INFORMATION: Primer

<400> SEQUENCE: 1
ttttcttgct ttcgtggta                                                    19

<210> SEQ ID NO 2
<211> LENGTH: 20
<212> TYPE: DNA
<213> ORGANISM: Artificial sequence
<220> FEATURE:
<223> OTHER INFORMATION: Primer

<400> SEQUENCE: 2
ggttttacaa gactcacgtt                                                   20

<210> SEQ ID NO 3
<211> LENGTH: 20
<212> TYPE: DNA
<213> ORGANISM: Artificial sequence
<220> FEATURE:
<223> OTHER INFORMATION: Probe

<400> SEQUENCE: 3
attgcagcag tacgcacaca                                                   20

<210> SEQ ID NO 4
<211> LENGTH: 22
<212> TYPE: DNA
<213> ORGANISM: Artificial sequence
<220> FEATURE:
<223> OTHER INFORMATION: Primer

<400> SEQUENCE: 4
caagtaagtt tctccgaatc cc                                                22

<210> SEQ ID NO 5
<211> LENGTH: 19
<212> TYPE: DNA
<213> ORGANISM: Artificial sequence
<220> FEATURE:
<223> OTHER INFORMATION: Primer

<400> SEQUENCE: 5
gctgaagtcc catgaccgt                                                    19

<210> SEQ ID NO 6
<211> LENGTH: 25
<212> TYPE: DNA
<213> ORGANISM: Artificial sequence
<220> FEATURE:
<223> OTHER INFORMATION: Probe

<400> SEQUENCE: 6
caactggagg tagagacgga ctgcg                                             25

<210> SEQ ID NO 7
<211> LENGTH: 20
<212> TYPE: DNA
<213> ORGANISM: Artificial sequence

```
<220> FEATURE:
<223> OTHER INFORMATION: Primer

<400> SEQUENCE: 7
ctttcgtggt attcttgcta                                            20

<210> SEQ ID NO 8
<211> LENGTH: 21
<212> TYPE: DNA
<213> ORGANISM: Artificial sequence
<220> FEATURE:
<223> OTHER INFORMATION: Primer

<400> SEQUENCE: 8
ctcacgttaa caatattgca g                                          21

<210> SEQ ID NO 9
<211> LENGTH: 19
<212> TYPE: DNA
<213> ORGANISM: Artificial sequence
<220> FEATURE:
<223> OTHER INFORMATION: Primer

<400> SEQUENCE: 9
agttacacta gccatcctt                                             19

<210> SEQ ID NO 10
<211> LENGTH: 21
<212> TYPE: DNA
<213> ORGANISM: Artificial sequence
<220> FEATURE:
<223> OTHER INFORMATION: Primer

<400> SEQUENCE: 10
tttaacacga gagtaaacgt a                                          21
```

RT-PCR DETECTION METHOD AND KIT FOR NOVEL CORONAVIRUS

TECHNICAL FIELD

The present invention belongs to the fields of biotechnology and molecular diagnosis. Specifically, the present invention relates to a Real-time fluorescent RT-PCR detection method and kit for Novel Coronavirus 2019-nCoV.

BACKGROUND

Since December 2019, many cases of pneumonia of unknown cause have been discovered one after another, which has now been confirmed to be an acute respiratory infectious diseases caused by a new type of coronavirus infection. Based on the current epidemiological survey, the incubation period is generally 3-7 days, with a maximum of 14 days. The clinical manifestations of the epidemic are mainly manifested by fever, fatigue, and dry cough. A few patients are accompanied by symptoms such as nasal congestion, runny nose, and diarrhea. Some patients only show low fever, mild fatigue, etc., without pneumonia, and most of them recovered after 1 week.

In view of the phenomenon of human-to-human transmission in patients during the incubation period of the disease, there is an urgent need for a sensitive and precise method for the rapid detection of pneumonia caused by 2019-nCoV infection. The "*Diagnosis and Treatment Protocol for Novel Coronavirus Pneumonia*" clearly stipulates that suspected cases require one of the following etiological evidences to be diagnosed: 1. Respiratory specimens or blood specimens are positive for novel coronavirus nucleic acid detected by real-time fluorescent RT-PCR; 2. The sequencing of virus gene of the respiratory specimen or blood specimen is highly homologous to known novel coronavirus.

Real-time fluorescence RT-PCR is one of the common methods for coronavirus nucleic acid detection, which can be used for laboratory examination, epidemiological research, exclusion diagnosis, etc. The method has high sensitivity and good specificity, which can accurately and quickly provide the test results of the target virus. At present, the conventional detection method for novel coronavirus 2019-nCoV infection is through real-time fluorescence RT-PCR identification, mainly targeting the novel coronavirus 2019-nCoV genome open reading frame 1a/b (ORF1ab) and nucleocapsid protein (N). However, in view of the faster rate of RNA virus variation, it is easy to cause missed tests on mutant virus, which is not conducive to the timely discovery and prevention and control of the virus.

Therefore, it is necessary to develop a targeted detection system to prevent missed detections that may be caused by mutations.

SUMMARY OF THE INVENTION

The present invention has developed a novel coronavirus diagnostic system for novel coronavirus 2019-nCoV genome envelope protein (E). In order to be able to detect patients infected with the novel coronavirus 2019-nCoV with high efficiency, high specificity and low cost, and prevent possible variability.

In the first aspect of the present invention, it provides a primer pair set for detection of Novel Coronavirus 2019-nCoV nucleic acid comprising:

a first primer pair group, wherein the first primer pair group comprises:
a forward primer as shown in SEQ ID NO.1; and a reverse primer as shown in SEQ ID NO.2.

In another preferred embodiment, the primer pair set further includes:
an internal standard primer pair group, wherein the internal standard primer pair group comprises:
a forward primer as shown in SEQ ID NO.4; and a reverse primer as shown in SEQ ID NO.5.

In the second aspect of the present invention, it provides a probe set for multiplex detection of Novel Coronavirus 2019-nCoV nucleic acid, which includes a first probe whose nucleotide sequence is shown in SEQ ID NO. 3.

In another preferred embodiment, the probe set further includes an internal control probe whose nucleotide sequence is shown in SEQ ID NO.6.

In another preferred embodiment, the 5' end of each probe is labeled with a fluorescent reporter group; and/or, the 3' end of each probe is labeled with a fluorescence quenching group.

In another preferred embodiment, the fluorescent reporter groups labeled on the probes are different from each other.

In the third aspect of the present invention, it provides a kit for multiplex detection of Novel Coronavirus 2019-nCoV nucleic acid, which comprises the primer pair set according to the first aspect of the present invention.

In another preferred embodiment, the kit further comprises the probe set according to the second aspect of the present invention.

In another preferred embodiment, the kit comprises a first container, and the first container contains a primer and probe mix (primer-probe mixture), and the primer and probe mix contains polynucleotides having sequences shown in SEQ ID NOs. 1 to 6.

In another preferred embodiment, the kit further comprises a second container, and the second container contains a RT-PCR enzyme system including a Hot-start enzyme and a Reverse transcriptase C-MMLV; preferably further contains dNTPs.

In another preferred embodiment, the kit further includes a third container, and the third container contains RT-PCR reaction solution.

In another preferred embodiment, the kit further includes a fourth container, and the fourth container contains DEPC $H_2O$.

In the fourth aspect of the present invention, it provides a method for multiplex detection of Novel Coronavirus 2019-nCoV nucleic acid comprising the following steps:
(1) providing a nucleic acid sample of a subject to be tested;
(2) preparing a RT-PCR reaction system for the RT-PCR detection:
wherein the RT-PCR reaction system includes: the nucleic acid sample provided in step (1), the primer pair set according to the first aspect of the present invention, and the probe set according to the second aspect of the present invention.

In another preferred embodiment, the nucleic acid sample can be from a throat swab sample, a bronchoalveolar lavage fluid sample, a blood sample, a sputum sample, a stool sample or an environmental sample.

In another preferred embodiment, the method is a detection method for non-diagnostic purposes.

In another preferred embodiment, the RT-PCR reaction system further includes a positive control, and/or a negative control.

In another preferred embodiment, the RT-PCR reaction system further includes a RT-PCR enzyme system.

In a fifth aspect of the present invention, it provides a use of the primer pair set according to the first aspect of the present invention, and/or the probe set according to the second aspect of the present invention for preparing a PCR detection kit, the PCR detection kit is used to detect Novel Coronavirus 2019-nCoV nucleic acid.

It should be understood that, within the scope of the present invention, the technical features specifically described above and below (such as the examples) can be combined with each other, thereby constituting a new or preferred technical solution which needs not be described one by one.

DETAILED DESCRIPTION OF INVENTION

Figure 1:
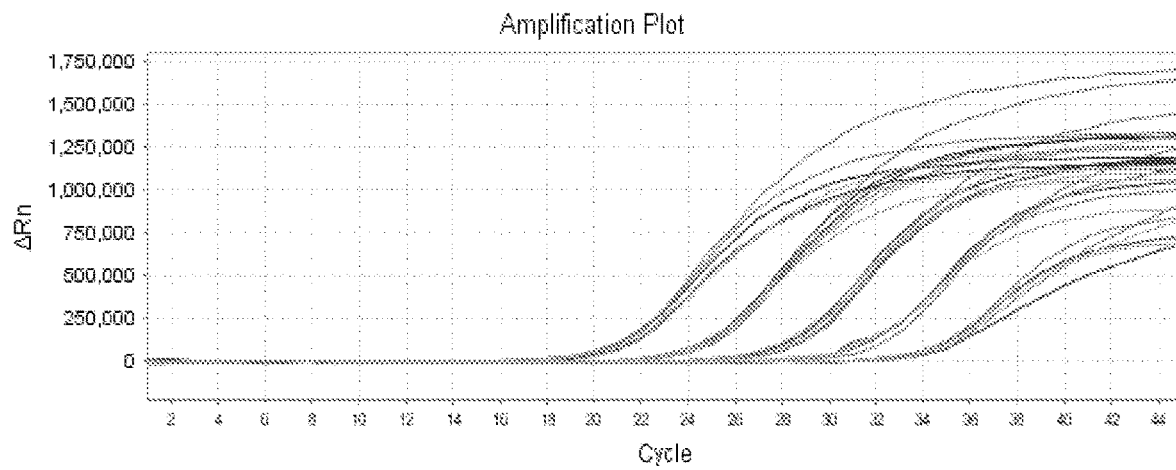
FIG. 1: Optimize the amplification curve of the detection system.

Through extensive and in-depth research, the inventors have obtained a kit and method for multiple detection of the nucleic acid of the novel coronavirus 2019-nCoV. It can detect patients infected with the novel coronavirus 2019-nCoV in a stable and low-cost way, prevent false negatives that may occur due to virus variability, and confirm missed detections that may be caused by mutations, which significantly improves the accuracy of virus identification.

Before describing the present invention, it should be understood that the present invention is not limited to the specific methods and experimental conditions as described, due to such methods and conditions may vary. It should also be understood that the terminology used herein is for the purpose of describing specific embodiments only and is not intended to be limiting, and the scope of the present invention will be limited only by the appended claims.

Unless otherwise defined, all technical and scientific terms used herein have the same meaning as commonly understood by those of ordinary skill in the art to which this invention belongs. As used herein, when used in reference to specifically recited value, the term "about" means that the value may vary from the recited value by no more than 1%. For example, as used herein, the expression "about 100" includes all values between 99 and 101 and (e.g., 99.1, 99.2, 99.3, 99.4, etc.).

Although any methods and materials similar or equivalent to those described in the present invention can be used in the practice or testing of the present invention, the preferred methods and materials are exemplified herein.

Multiplex PCR

Multiplex PCR, also known as multiple primers PCR or complex PCR, is a PCR reaction in which two or more pairs of primers are added to the same PCR reaction system to simultaneously amplify multiple nucleic acid fragments. The reaction principle, reaction reagents and operation process are the same as general PCR.

There are many factors that affect multiplex PCR reactions, such as:

(1) The imbalance of the reaction system. The imbalance of the reaction system leads to the rapid amplification of certain dominant primers and their templates in the previous rounds of reactions, and a large number of amplification products are obtained, and these amplification products are also good inhibitors of DNA polymerase. Therefore, as a large number of amplification products appear, the polymerization ability of the polymerase is more and more strongly inhibited. Therefore, the primers and their templates that are at a disadvantage in the early stage are more difficult to react, resulting in a very small amount of amplification product that cannot be detected.

(2) Primer specificity. If the primer has stronger binding ability with other non-target gene fragments in the system, the ability of the target gene to bind to the primer will be contested, resulting in a decrease in amplification efficiency.

(3) The optimal annealing temperature is inconsistent. Multiple pairs of primers are put into one system for amplification. Since the annealing temperature for PCR reaction is the same, the optimal annealing temperature of each pair of primers is required to be close.

(4) Primer dimers, including the dimers between primers and the hairpin structure formed by the primers themselves, and there is also a third-party DNA-mediated polymer. Like non-specific primers, these dimers will interfere with the competition between the primer and the target binding site, affecting the amplification efficiency.

Although several factors affecting the efficiency of amplification are mentioned as above, more factors are unclear. So far, there is no effective method that can clearly predict the amplification efficiency.

The invention relates to the fields of biological detection technology and medical diagnosis, in particular to a real-time fluorescent RT-PCR detection method for novel coronavirus (2019-nCoV). This kit mainly includes RT-PCR reaction solution, primer-probe mixture, RT-PCR reaction enzyme system, DEPC $H_2O$, and packaging boxes for separating and centrally packaging these reagent bottles or tubes.

According to the diagnosis and treatment guidelines of the novel coronavirus, the nucleic acid test of the novel coronavirus is the gold standard for diagnosis. The present invention develops a detection kit for detecting the E gene of the novel coronavirus. The kit also includes an endogenous internal standard detection system, which is used for the monitoring of sample collection, nucleic acid extraction process and PCR amplification process, which can reduce the occurrence of false negative results. This kit is a dual fluorescence detection kit with high sensitivity, strong specificity and good repeatability.

The present invention provides a kit for specifically detecting the novel coronavirus 2019-nCoV E gene in a sample, wherein the primer sequences for detecting the E gene are:

SEQ ID NO. 1: TTTTCTTGCTTTCGTGGTA and SEQ ID NO. 2: GGTTTTACAAGACTCACGTT, and the corresponding detection probe sequence is SEQ ID NO.3: ATTGCAGCAGTACGCACACA.

In one embodiment, the kit further includes internal standard quality control and amplification primers and detection probes; the sequences of the internal standard quality control amplification primers are:

SEQ ID NO. 4: CAAGTAAGTTTCTCCGAATCCC and SEQ ID NO. 5: GCTGAAGTCCCATGACCGT, and the sequence of the corresponding detection probe is SEQ ID NO. 6: CAACTGGAGGTAGAGACGGACTGCG.

In one embodiment, the kit includes a positive quality control substance (Pseudovirus containing the target sequence of E gene), and a negative quality control substance (Hela cell nucleic acid).

In one embodiment, the kit includes RT-PCR reaction solution, primer-probe mixture, RT-PCR reaction enzyme system, and DEPC H$_2$O. Preferably, the RT-PCR reaction solution includes: Tris-HCl with pH 8.8, Mg$^{2+}$, Tween-20. Preferably, the primer-probe mixture comprises: primer-probe sequences shown in SEQ ID NOs. 1-6. Preferably, RT-PCR reaction enzymes include: Hot-start Taq enzyme, Reverse transcriptase and dNTPs.

The present invention also provides a method for detecting novel coronavirus (2019-nCoV), includes the following steps: extracting a sample to be tested (extraction reagent using nucleic acid extraction or purification reagent produced by Daan Gene Co., Ltd. of Sun Yat-sen University (Yuehuixiebei No. 20170583)) to obtain nucleic acid samples; then it is mixed with RT-PCR reaction solution, primer probe mixture, RT-PCR reaction enzyme system and DEPC H$_2$O; and the amplification reaction is carried out in a real-time fluorescence PCR instrument. The PCR amplification procedure is as follows;

50° C., 15 min, 1 cycle
95° C., 15 min; 1 cycle
94° C., 15 sec, 55° C., 45 sec (collecting fluorescence); 45 cycles.

After PCR is completed, different fluorescence channel curves and Ct values are used to determine the negative and positive of the corresponding pathogen nucleic acid. The test results can be used for the auxiliary diagnosis of novel coronavirus infection and the observation of drug efficacy, providing a reliable basis for research.

For the gene sequence of the novel coronavirus 2019-nCoV in the present invention, please refer to GISAID: BetaCov/Wuhan/WH01/2019|EPI_ISL_406798; for the oligonucleotide sequence information of its E gene, please refer to the reference: Roujian Lu, Xiang Zhao, Juan Li, et. al, *Genomic characterisation and epidemiology of 2019 novel coronavirus: implications for virus origins and receptor binding. Lancet. 2020 Jan. 30.*

The composition of this kit is shown in Table 1 and Table 2. It can specifically detect the E gene of the novel coronavirus 2019-nCoV, and confirm the missed detection that may be caused by mutation, which can significantly improve the accuracy of virus identification.

TABLE 1

Kit composition

| Composition | Main component |
|---|---|
| RT-PCR reaction solution | Tris-HCl with pH 8.8, Mg$^{2+}$, Tween-20 |
| Primer probe mix | Primers and probes (SEQ ID NOs. 1-6) |
| RT-PCR reaction enzyme system | Hot start Taq enzyme, reverse transcriptase, dNTPs |
| DEPC H$_2$O | — |

The primer and probe sequences required by the kit are shown in Table 2:

TABLE 2

Primers, probes and sequence numbers

| Primer and probe name | Primer/probe sequence | SEQ ID NO. |
|---|---|---|
| E-NCOV-F | TTTTCTTGCTTTCGTGGTA | 1 |
| E-NCOV-R | GGTTTTACAAGACTCACGTT | 2 |
| E-NCOV-P | ATTGCAGCAGTACGCACACA | 3 |
| RP30-F | CAAGTAAGTTTCTCCGAATCCC | 4 |
| RP30-R | GCTGAAGTCCCATGACCGT | 5 |
| RP30-P | CAACTGGAGGTAGAGACGGACTGCG | 6 |

Preferably, the fluorescent group is selected from the group consisting of FAM, VIC, HEX, NED, ROX, TET, JOE, TAMRA, CY3, and CY5.

Preferably, the quenching group is selected from the group consisting of MGB, BHQ-1, BHQ-2, and BHQ-3.

In the primer design of the present invention, the specific primers and probes are screened by a large number of tests, and then combined, optimized and verified and finally dual primer-probe combinations that will not interfere with each other, have high amplification efficiency, and have good specificity are finally screened.

The criteria used by the kit of the present invention to determine the effectiveness of the detection are:

Negative control and positive control are simultaneously detected in each test. When the test result of the positive control is positive and the test result of the negative control is negative, the test result is valid.

The method for using the kit of the present invention includes the following steps:

(1) Extracting the total nucleic acid in the test sample to obtain a nucleic acid sample.

(2) Mixing the nucleic acid sample with the RT-PCR reaction solution, primer-probe mixture, RT-PCR reaction enzyme system and DEPC H$_2$O to prepare a PCR reaction system.

(3) Performing Real-time fluorescence PCR reaction, and the procedure is as follows:

the first stage: 50° C. 2-15 min, 95° C. 10-15 min, 1 cycle;
the second stage: 94° C.10-15 s, 55-60° C. 45 s, 45 cycles.

After PCR, different fluorescence channel curves and Ct values were used to judge the negative and positive of the corresponding pathogen nucleic acid, and the detection result was given.

The Beneficial Effects of the Present Invention Include (1) The present invention can detect the novel coronavirus 2019-nCoV infected patients with high efficiency, high specificity and low cost by targeted detection of the membrane protein nucleic acid target of the novel coronavirus 2019-nCoV, and prevent false negatives that may occur due to virus variability, and confirm missed detections that may be caused by mutations significantly improves the accuracy of virus identification.

(2) The detection kit of the present invention also includes a membrane protein nucleic acid target detection system and an endogenous internal standard detection system of the novel coronavirus 2019-nCoV. And the present invention is a dual fluorescence detection kit, which can monitor the specimen collection, nucleic acid extraction process and PCR amplification process to reduce the occurrence of false negative results.

(3) After multiple rounds of screening and verification, the present invention obtains a primer-probe combination with high sensitivity, strong specificity, good repeatability and suitable for multiple detection from a large number of primer-probe combinations.

The present invention is suitable for the detection of novel coronavirus 2019-nCoV nucleic acid, and can provide a reliable basis for virus identification and prevention and control, and is worthy of popularization and application. In addition, the method of the present invention is also suitable for non-diagnostic purposes. For example, in the epidemic prevention and control process, the detection method of the present invention can be used to detect viral nucleic acids in the environment, and these viral nucleic acid information can be used for public health management.

The present invention will be further described in detail below in conjunction with specific embodiments. It should be understood that these examples are only used to illustrate the present invention and not to limit the scope of the present invention. The experimental methods without detailed conditions in the following examples are generally in accordance with the conditions described in the conventional conditions such as Sambrook. J et al. "*Guide to Molecular Cloning Laboratory*" (translation by Huang Peitang et al., Beijing: Science Press, 2002), or as recommended by the manufacturer. Unless otherwise stated, percentages and parts are calculated by weight. Unless otherwise specified, the experimental materials and reagents used in the following examples can be obtained from commercially available channels.

Example 1. Design of Primers and Probes

Based on the sequence of the novel coronavirus, analyze the conserved regions of its genome. Dozens of sets of specific primers and probe sequences for the detection of the novel coronavirus 2019-nCoV E gene were designed in these conserved regions. In addition, in order to monitor the process of specimen collection, nucleic acid extraction and PCR amplification, ribonuclease P (RPP30) in human genomic DNA was selected to design internal standard primers and probes.

In the design process of the above-mentioned primers and probes, the formation of hairpin structures, intra-primer dimers, inter-primer dimers and mismatches needs to be avoided as much as possible.

In addition, the above-designed novel coronavirus-specific primers and probe sequences were analyzed by aligning the NCBI Blast online database https://blast.ncbi.nlm.nih.gov/Blast.cgi) to avoid non-specific binding with other viruses or human genes. Through multiple rounds of screening and optimization, a set of primers and probe sequences with optimal sensitivity and specificity were finally determined.

Primer probe sequences:

| Sequence name | Sequences | SEQ ID NOs. |
|---|---|---|
| E-NCOV-F | TTTTCTTGCTTTCGTGGTA | 1 |
| E-NCOV-R | GGTTTTACAAGACTCACGTT | 2 |

-continued

Primer probe sequences:

| Sequence name | Sequences | SEQ ID NOs. |
|---|---|---|
| E-NCOV-P | ATTGCAGCAGTACGCACACA | 3 |
| RP30-F | CAAGTAAGTTTCTCCGAATCCC | 4 |
| RP30-R | GCTGAAGTCCCATGACCGT | 5 |
| RP30-P | CAACTGGAGGTAGAGACGGACTGCG | 6 |

Among them, the 5'-terminal fluorescent group of E-NCOV-P is FAM, and the 3'-terminal quenching group is BHQ1; the 5'-terminal fluorescent group of RP30-P is VIC, and the 3'-terminal quenching group is BHQ1.

Example 2. Detection Method and System

The principle of the Taqman probe used to detect the novel coronavirus RNA is: First use the added primer sequences E-NCOV-F and E-NCOV-R as reverse transcription primers to reverse-transcribe the extracted viral RNA into cDNA with an anchor sequence, then use E-NCOV-F and E-NCOV-R as forward and reverse primers for real-time PCR detection for amplification.

This method is a one-step amplification method, which combines the two steps of reverse transcription of viral RNA into cDNA and DNA amplification, without the need to change tubes for operation.

The results showed that when the E-NCOV-F, E-NCOV-R primer concentrations were 10 pmol, the E-NCOV-P probe concentration was 5 pmol, the RP30-F, RP30-R primer concentrations were 8 pmol, and the RP30-R probe concentration was 3 pmol, the amplification curve was the best.

In order to determine the detection system of primers and probes, the effects of different concentrations of primers and probes on fluorescent PCR reaction were tried. The detection results are shown in FIG. 1. From left to right in FIG. 1 are the pseudovirus gradient detection results when the primer concentrations are 15 pmol, 10 pmol, and 8 pmol, and the probe concentrations are 8 pmol, 5 pmol, and 3 pmol, respectively.

The finalized reaction system (25 µL) is as follows:

| | |
|---|---|
| RT-PCR reaction solution | 5 µL |
| Primer probe mix | 5 µL |
| RT-PCR reaction enzyme system | 3 µL |
| DEPC H$_2$O | 7 µL |
| Nucleic acid of the sample to be tested | 5 µL |

The RT-PCR reaction enzyme is composed of Hot-start Taq enzyme, Reverse transcriptase and dNTPs. Common reverse transcriptases such as mMLV can be selected as reverse transcriptases. Hot-start Taq enzyme, Reverse transcriptase, and dNTPs can all use commercially available products, such as Qiagen's products. In each RT-PCR reaction enzyme system, the amount of Hot-start Taq enzyme is 8U, the amount of Reverse transcriptase is 3U, and the amount of dNTPs was 10 mmol.

By testing different annealing temperatures, the reaction program on the ABI7500 fluorescence PCR instrument was finally determined as: 50° C. for 15 minutes, 1 cycle; 95° C. for 15 minutes, 1 cycle; 94° C. for 15 seconds→55° C. for 45 seconds (collection fluorescence), 45 cycles.

Example 3. Sensitivity Test

The target fragment was ligated into the constructed pET28a-MS2 vector and transformed into the expression host BL21 competent cells, and then single clone was picked and sequenced for verification, followed by induction of expression. The fragmented expression product was digested with RNaseA and DNaseI, and then the virus-like particles containing the target fragment were obtained.

After the determination of the concentration, the pseudovirus was diluted to an appropriate concentration, and then 10-fold specific dilution was performed, and the concentrations were 1.00E+06, 1.00E+05, 1.00E+04, 1.00E+03, and 1.00E+02 copies/ml.

Figure 2:
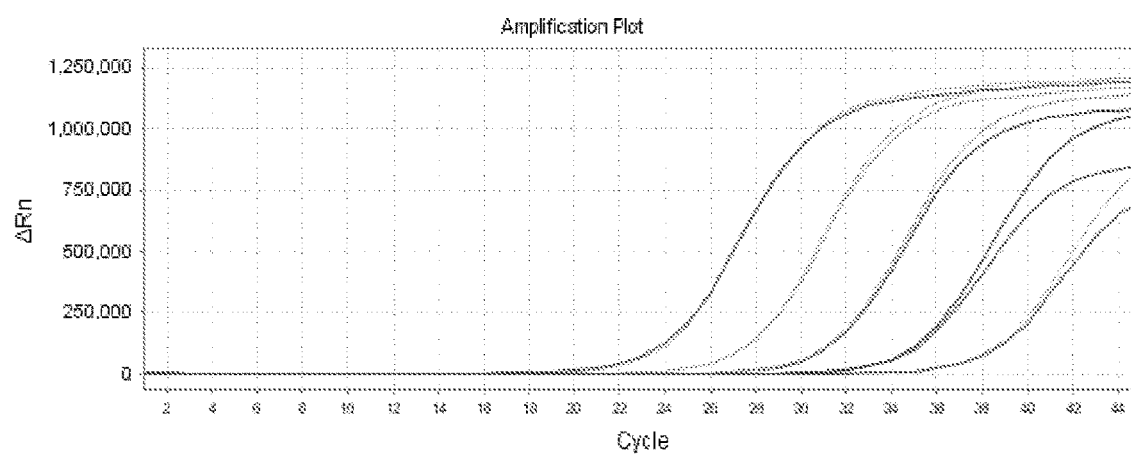
FIG. 2: Sensitivity test results.

The above pseudoviruses were detected using the detection system and cycling parameters determined above (FIG. 2). The results show that this detection method has high sensitivity, and the sensitivity is 1.00E+02 copies/ml.

Example 4. Specificity Test

Figure 3:
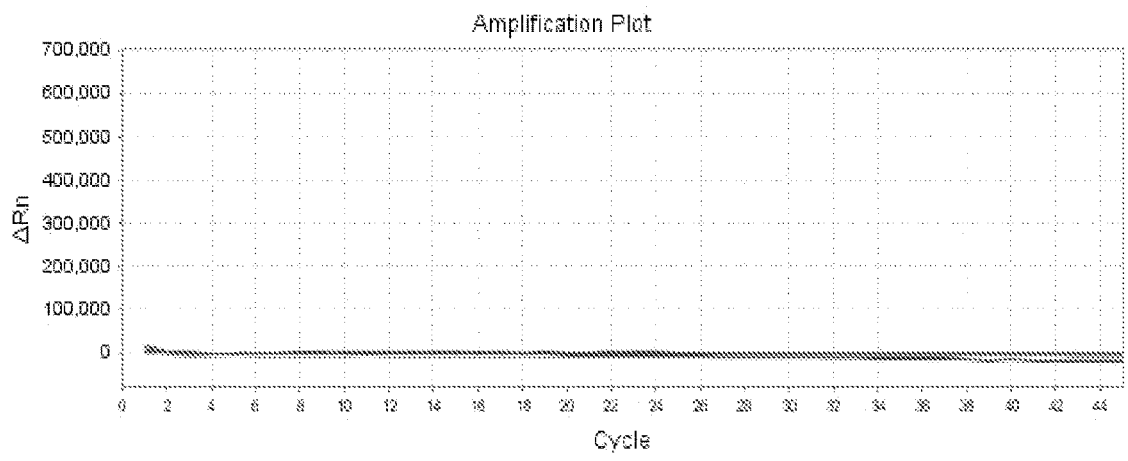
FIG. 3: Specific test results.

Influenza A/B virus, Coronavirus 229E, Coronavirus NL63, Coronavirus OC43, Coronavirus HKU1, Respiratory syncytial virus, Adenovirus, *Mycoplasma pneumoniae*, and *Chlamydia pneumoniae* were used as specific samples and tested (FIG. 3).

The test results showed that the detection results of the specific reference products (Influenza A/B virus, Coronavirus 229E, Coronavirus NL63, Coronavirus OC43, Coronavirus HKU1, Respiratory syncytial virus, Adenovirus, *Mycoplasma pneumoniae, Chlamydia pneumoniae*) were all negative, indicating that the specificity of the kit of the present invention is good.

Example 5. Repeatability Test

Figure 4:
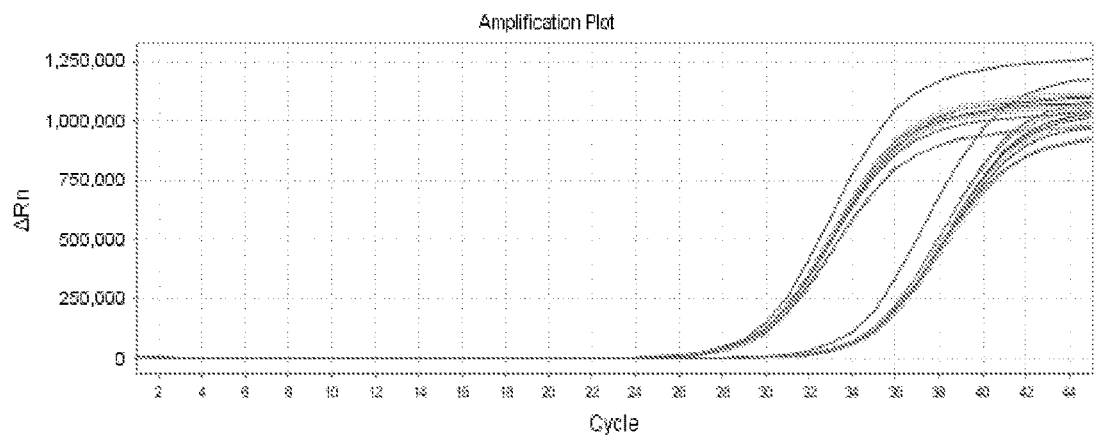
FIG. 4: Repeatable test results.

Pseudoviruses with concentrations of 5.00E+04 copies/ml and 1.00E+03 copies/ml were selected for detection, using the detection system and cycle parameters determined above, and each repeated 10 times (FIG. 4).

The results show that the kit and the detection method of the present invention have good repeatability.

Example 6. Clinical Samples Detection

Extraction of Nucleic Acid from the Tested Samples:
(1) Extraction of Nucleic Acid Template from Clinical Samples to be Tested Collect clinical samples of throat swabs from 22 suspected patients, and the nucleic acid samples were obtained using the nucleic acid extraction or purification reagent (Yuehuixiebei No. 20170583) from Daan Gene Co., Ltd. of Sun Yat-sen University (the positive control and the negative control were involved in the extraction simultaneously). Take 5 µL of nucleic acid samples to prepare a PCR reaction system, and perform the amplification reaction in a real-time fluorescence PCR instrument, and the fluorescent channels were selected in order of VIC and FAM. The PCR amplification procedure was as follows:

50° C., 15 min, 95° C., 15 min; 1 cycle
94° C., 15 sec, 55° C., 45 sec (to collect fluorescence); 45 cycles.

Figure 5:
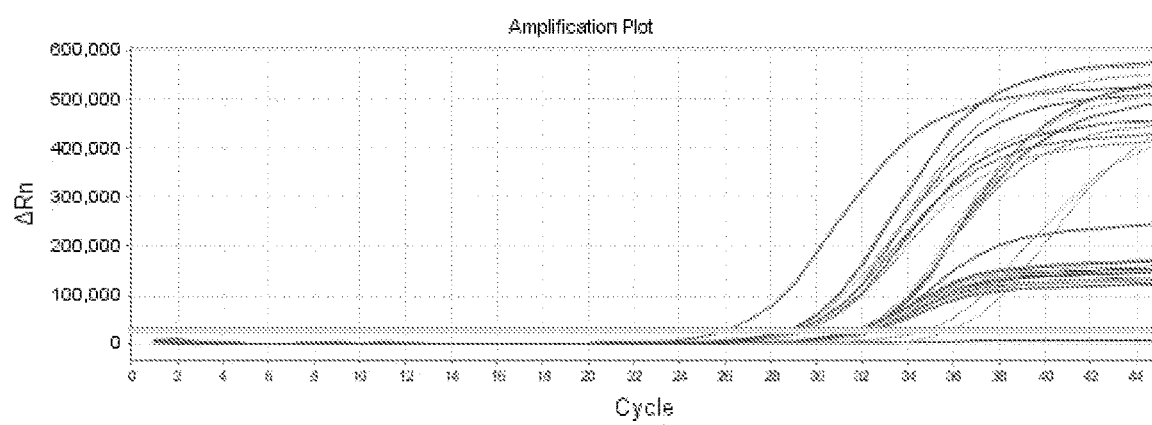
FIG. 5: Typical clinical sample test results.

In the tested 22 suspected clinical samples, a total of 17 novel coronavirus 2019-nCoV nucleic acid positive clinical samples were detected. Typical test results were shown in FIG. 5.

Sequencing verification results showed that the detection accuracy of the detection system of the present invention reached 100%, which further proved the accuracy of clinical detection of the system of the present invention.

Comparative Example 1

In the research process, the present inventor screened dozens of PCR primers and probes for the novel coronavirus 2019-nCoV target nucleic acid sequence. After extensive testing, a combination of primers and probes with sensitivity and specificity that can meet the needs of clinical testing and can perform multiple tests was finally obtained.

For the detection target of the E gene of novel coronavirus 2019-nCoV, the inventors have undergone a lot of screening and combination. Some typical primer sequences designed are as follows:

```
Control upstream primer E-NCOV-F2:
                                     (SEQ ID NO. 7)
CTTTCGTGGTATTCTTGCTA Control upstream primer E-NCOV-R2:
                                     (SEQ ID NO. 8)
CTCACGTTAACAATATTGCAG Control upstream primer E-NCOV-F3:
                                     (SEQ ID NO. 9)
AGTTACACTAGCCATCCTT Control upstream primerE-NCOV-R3:
                                    (SEQ ID NO. 10)
TTTAACACGAGAGTAAACGTA
```

The PCR detection test was carried out using the same specific detection steps, detection conditions, and probe sequences as in the above embodiment.

Figure 6:
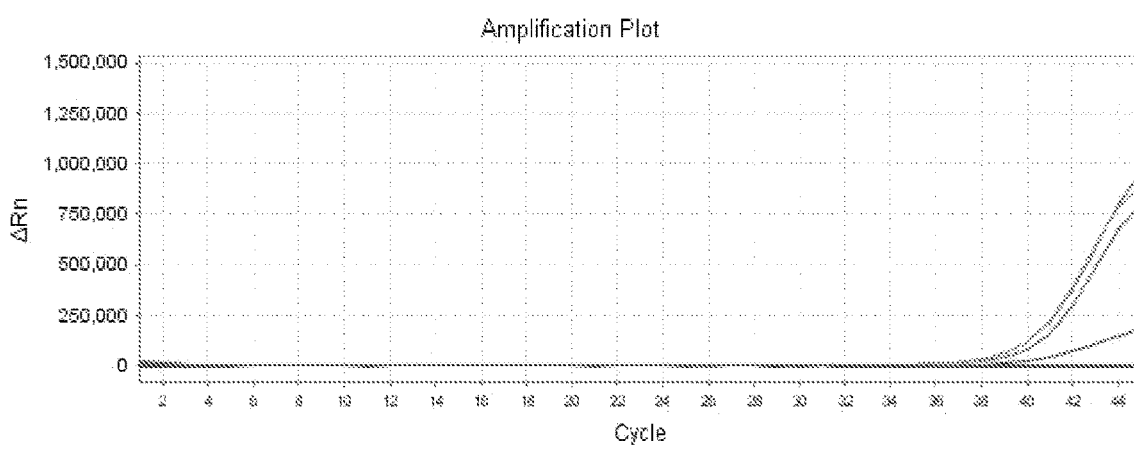
FIG. 6: The detection results of the control primer pairs E-NCOV-F2 and E-NCOV-R2.

The detection results using E-NCOV-F2 and E-NCOV-R2 were shown in FIG. 6 and the detection results indicate that the primer pair had poor specificity.

Figure 7:
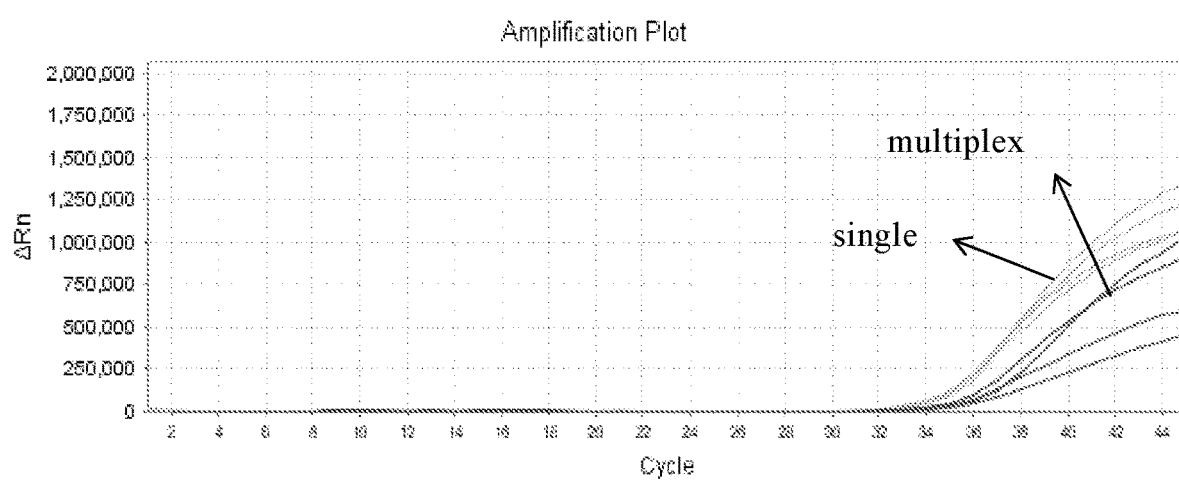
FIG. 7: The detection results of the control primer pairs E-NCOV-F3 and E-NCOV-R3.

The detection results using E-NCOV-F3 and E-NCOV-R3 indicated that the primer pair had better specificity and sensitivity to the E gene target nucleic acid in a single detection system. However, in the multiplex detection system, the amplification of low concentration nucleic acid of E gene was significantly inhibited. The results of single and multiplex systems tests were shown in FIG. 7. This indicated that the control primer pairs E-NCOV-F3 and E-NCOV-R3 cannot be used in multiplex detection systems.

All literatures mentioned in the present application are incorporated herein by reference, as though each one is individually incorporated by reference. In addition, it should also be understood that, after reading the above teachings of the present invention, those skilled in the art can make various changes or modifications, equivalents of which falls in the scope of claims as defined in the appended claims.

What is claimed:

1. A kit for detection of novel coronavirus 2019-nCOV nucleic acid, which comprises a primer pair set and a probe set;
   wherein the primer pair set comprises a first primer pair and an internal standard primer pair;
   wherein the first primer pair comprises a forward primer as shown in SEQ ID NO.1 and a reverse primer as shown in SEQ ID NO.2;
   wherein the internal standard primer pair comprises a forward primer as shown in SEQ ID NO.4 and a reverse primer as shown in SEQ ID NO.5; and
   wherein the probe set comprises a first probe whose nucleotide sequence is shown in SEQ ID NO.3 and an internal control probe whose nucleotide sequence is shown in SEQ ID NO.6;
   wherein the 5' end of the first probe is labeled with a first fluorescent reporter group, and the 3' end of the first probe is labeled with a first fluorescence quenching group; the 5' end of the internal control probe is labeled with a second fluorescent reporter group, and the 3' end of the internal control probe is labeled with a second fluorescence quenching group; and the first fluorescent reporter group is different from the second fluorescent reporter group.

2. The kit of claim 1, wherein the kit includes a first container, and the first container contains a primer and probe mix, and the primer and probe mix contains the primer pair set and the probe set.

3. The kit of claim 2, wherein the kit further includes a second container, and the second container contains a RT-PCR enzyme system including a hot-start enzyme and a reverse transcriptase.

4. The kit of claim 3, wherein the second container further contains dNTPs.

5. The kit of claim 2, wherein the kit further includes a third container, and the third container contains a RT-PCR reaction solution, and the RT-PCR reaction solution includes Tris-HCl buffer, $Mg^{2+}$, and Tween-20.

6. The kit of claim 2, wherein the kit further includes a fourth container, and the fourth container contains a DEPC $H_2O$.

7. The kit of claim 1, wherein the first fluorescent reporter group at the 5' end of the first probe is FAM, the first fluorescence quenching group at the 3' end of the first probe is BHQ1, the second fluorescent reporter group at the 5' end of the internal control probe is VIC, and the second fluorescent quenching group at the 3' end of the internal control probe is BHQ1.

8. A method for multiplex detection of a novel coronavirus 2019-nCOV nucleic acid for non-diagnostic purposes, the method comprising:
   providing a nucleic acid sample from a subject to be tested;
   providing an RT-PCR reaction system; and
   perform-performing a RT-PCR detection of the novel coronavirus 2019-nCOV, wherein the RT-PCR reaction system includes:
(i) the nucleic acid sample; and
(ii) a primer pair set and probe set, wherein the primer pair set includes a first primer pair and an internal standard primer pair, wherein the first primer pair comprises a forward primer as shown in SEQ ID NO.1 and a reverse primer as shown in SEQ ID NO.2, and the internal standard primer pair comprises a forward primer as shown in SEQ ID NO.4 and a reverse primer as shown in SEQ ID NO.5, and wherein the probe set comprises a first probe whose nucleotide sequence is shown in SEQ ID NO. 3, and an internal control probe whose nucleotide sequence is shown in SEQ ID NO.6.

9. The method of claim 8, wherein the 5' end of the first probe is labeled with a first fluorescent reporter group, and the 3' end of the first probe is labeled with a first fluorescence quenching group; the 5' end of the internal control probe is labeled with a second fluorescent reporter group, and the 3' end of the internal control probe is labeled with a second fluorescence quenching group; and the first fluorescent reporter group is different from the second fluorescent reporter group.

10. The method of claim 9, wherein the first fluorescent reporter group at the 5' end of the first probe is FAM, the first fluorescence quenching group at the 3' end of the first probe is BHQ1; the second fluorescent reporter group at the 5' end of the internal control probe is VIC, and the second fluorescent quenching group at the 3' end of the internal control probe is BHQ1.

11. The method of claim 8, wherein the RT-PCR reaction system further comprises a RT-PCR enzyme system.

12. The method of claim 11, wherein the RT-PCR enzyme system comprises a hot-start enzyme and a reverse transcriptase C-MMLV.

13. The method of claim 12, wherein the RT-PCR enzyme system further comprises dNTPs.

14. The method of claim 8, wherein the RT-PCR reaction system further includes RT-PCR reaction solution, which comprises Tris-HCI buffer, $Mg^{2+}$ and Tween-20.

* * * * *